United States Patent [19]
Karasudani

[11] Patent Number: 5,253,050
[45] Date of Patent: Oct. 12, 1993

[54] DISTANCE MEASURING DEVICE FOR MEASURING THE DISTANCE BETWEEN VEHICLES

[75] Inventor: Keiko Karasudani, Hyogo, Japan

[73] Assignee: Mitsubishi Denki K.K., Tokyo, Japan

[21] Appl. No.: 845,269

[22] Filed: Mar. 3, 1992

[30] Foreign Application Priority Data

Mar. 20, 1991 [JP] Japan .................. 3-055415

[51] Int. Cl.⁵ .............................. H04N 7/18
[52] U.S. Cl. ..................... 358/103; 358/107
[58] Field of Search .......... 358/103, 105, 107, 125, 358/126

[56] References Cited

U.S. PATENT DOCUMENTS

5,023,712  6/1991  Kajiwara .................. 358/105
5,139,327  8/1992  Tanaka ..................... 358/126

FOREIGN PATENT DOCUMENTS

63-38085  7/1988  Japan .
63-46363  9/1988  Japan .
135305    7/1989  Japan .

*Primary Examiner*—Tommy Chin
*Assistant Examiner*—Richard Lee
*Attorney, Agent, or Firm*—Sughrue, Mion, Zinn, Macpeak & Seas

[57] ABSTRACT

A distance measuring device including an optical system for measuring a distance by trigonometric measurement, a display device for displaying an object, image following device for following an image of the object by a following window, first and second distance detecting device for calculating distances from the optical system to objects of which the images are present in the following window and the subwindow located adjacent thereto, image-following-condition detecting device for detecting a condition of following an image of the object by the following window, and window-setting renewal device for renewing the settings of all the subwindows on the basis of the data of the calculated distance and the detected image-following-condition.

5 Claims, 7 Drawing Sheets

DISTANCE MEASURING DEVICE FOR MEASURING THE DISTANCE BETWEEN VEHICLES

BACKGROUND OF THE INVENTION

The present invention relates to an optical type distance measuring device using image sensors, and more specifically, a vehicle-to-vehicle distance measuring device for continuously measuring a distance from a measuring vehicle to a forerunning vehicle.

Figure 12:
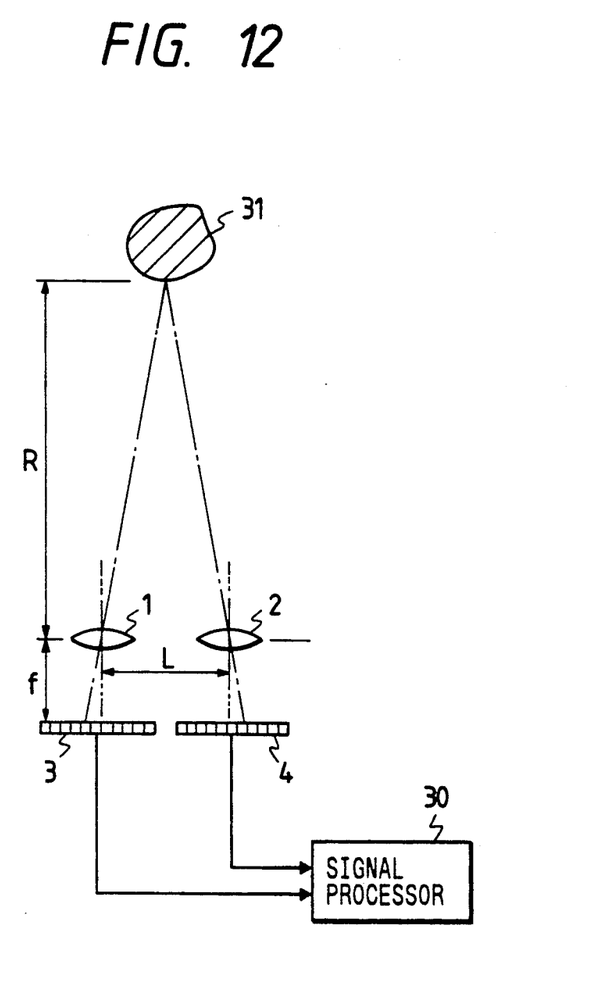
FIG. 12 is a schematic and block diagram showing the construction of a conventional distance measuring device.

The conventional optical type distance measuring devices using image sensors are disclosed in Japanese Patent Publication Nos. Sho. 63-38085 and Sho. 63-46363. Any of those devices, as shown in FIG. 12, contains right and left optical systems including lenses 1 and 2, respectively, spaced from each other by as much as a base length L. Image sensors 3 and 4 are disposed at the positions of the focal length f of the lenses 1 and 2, respectively. A signal processor 30 electrically superimposed the image signals from the image sensors 3 and on each other while successively shifting the image signals from one sensor with respect to the image signals from the other sensor, and calculates, by the following equation, a distance R from the measuring vehicle to an object 31 by using a quantity (d) of a displacement of the images of which image signals are best coincident with each other, on the basis of the principle of the trigonometric measurement.

Formula 1

$$R = (f \times L)/d$$

A method for following an image of a forerunning vehicle picked up by the image sensors, for example, is disclosed in Japanese Patent Publication No. Sho. 60-33352. In the disclosure, an operator sets a following gate (window) including the target to be followed on the screen of a display unit, while watching the screen, so as to follow an image of the target.

As described above, the conventional distance measuring device is constructed such that the distance from the measuring vehicle to the object is obtained by comparing the images picked up by the right and left optical systems. In case of measuring a distance from a measuring vehicle to a forerunning vehicle, if other vehicle runs on the right or left side of the forerunning vehicle in the same direction, there is a problem that the driver in the measuring vehicle may not find the vehicle which is measured.

In connection with the method of following an image of a forerunning vehicle picked up by the image sensors, for example, the conventional image following device is constructed such that, an operator sets a following gate (window) including the target to be followed on the screen of a display unit, while watching the screen, so as to follow an image of the target. Hereupon, once the window catches the target, the conventional device can continuously follow the target image even if the target is moving, so long as the target is within the field of sight.

In an actual situation, however, another vehicle is apt to intrude into a space between the measuring vehicle and the forerunning vehicle. In such a situation, the vehicle thus far treated as the forerunning vehicle is now the "forerunning vehicle", and the intruding vehicle is now treated as a new "forerunning vehicle" in place of the old one.

In the conventional image following device, once an image of the forerunning vehicle is set as a target on the display screen, the target may be followed so long as it is on the screen, that is, the forerunning vehicle as the target is within the field of sight. When another vehicle intrudes into a space between the measuring vehicle and the forerunning vehicle, the target image of the forerunning vehicle disappears from the screen. Under this condition, the conventional image following device not only cannot follow the image of the forerunning vehicle but also cannot detect the appearance of a new "forerunning vehicle". Therefore, if the measuring vehicle continues to run, it will possibly collide with the intruding vehicle.

SUMMARY OF THE INVENTION

An object of the present invention has been made to solve the problems as described above, and to provide a distance measuring device which has a distance detecting system and an image following system, is capable not only of selecting and distinctly showing a forerunning vehicle under distance measurement from among a plurality of forerunning vehicles, but also of simultaneously measuring a distance from the measuring vehicle to another vehicle running on the side of the forerunning vehicle. The present invention has another object to provide a vehicle-to-vehicle distance measuring device operable such that, once an object to be followed is set, the distance measuring device can continuously measure a distance from the measuring device to the object so long as it is within the field of sight, and can detect the appearance of an intruding vehicle, and that when an intruding vehicle appears and as a result, a forerunning vehicle having thus far been under the image following operation disappears from the screen, the distance measuring device treats the intruding vehicle as a new forerunning vehicle, continues the image following operation, and measures a distance from the measuring vehicle to the new forerunning vehicle so long as it is within the field of sight.

The foregoing objects and other objects of the present invention have been achieved by providing a distance measuring device which, according to the present invention, has display means for displaying an image of a forerunning vehicle picked up by either of image sensors substantially vertically arranged. Further, image following means for setting a following window in a part including said vehicle image on said display means and subwindows adjacent to the following window, whereby following an image of the forerunning vehicle by the following window, is provided. Image-following-condition detecting means for detecting a condition of following an image of the forerunning vehicle by the following window, on the basis of the image signal data within the following window is also provided. First and second distance detecting means for calculating distances from a measuring vehicle to objects of which the images are included in the following window and the subwindow is additionally provided. Window-setting renewal means for detecting the appearance of an intruding vehicle on the basis of the distance data detected by the first and second distance detecting means and the image-following-condition data detected by the image-following-condition detecting means, and for renewing the settings of the following window and the subwindows and consequently for changing the forerunning vehicle thus far including in the following window to a new one, is furthermore provided.

In the thus constructed distance measuring device of the invention, the first and second distance detecting means detect the deviations between the upper and lower corresponding image signals. In detecting the image signal deviations, by using the image signals within the following window and subwindows as the reference signals, those distance detecting means calculate the distances from the measuring vehicle to the objects on the basis of the deviations detected. The image-following-condition detecting means arithmetically calculates the image signal within the following window, thereby to detect a variation of the image-following-condition within the following window. The window-setting renewal means detects the appearance of an intruding vehicle on the basis of the distance data detected by the first and second distance detecting means and the image-following-condition data detected by the image-following-condition detecting means, and renewing the settings of the following window and the subwindows so that the following window treats the intruding vehicle as a new target and follows an image of the new target.

DETAILED DESCRIPTION OF THE PREFERRED EMBODIMENT

A preferred embodiment of the present invention will be described with reference to the accompanying drawings. Throughout the drawings, the elements having same or the like characters will be used same numerical number, for simplicity.

Figure 1:
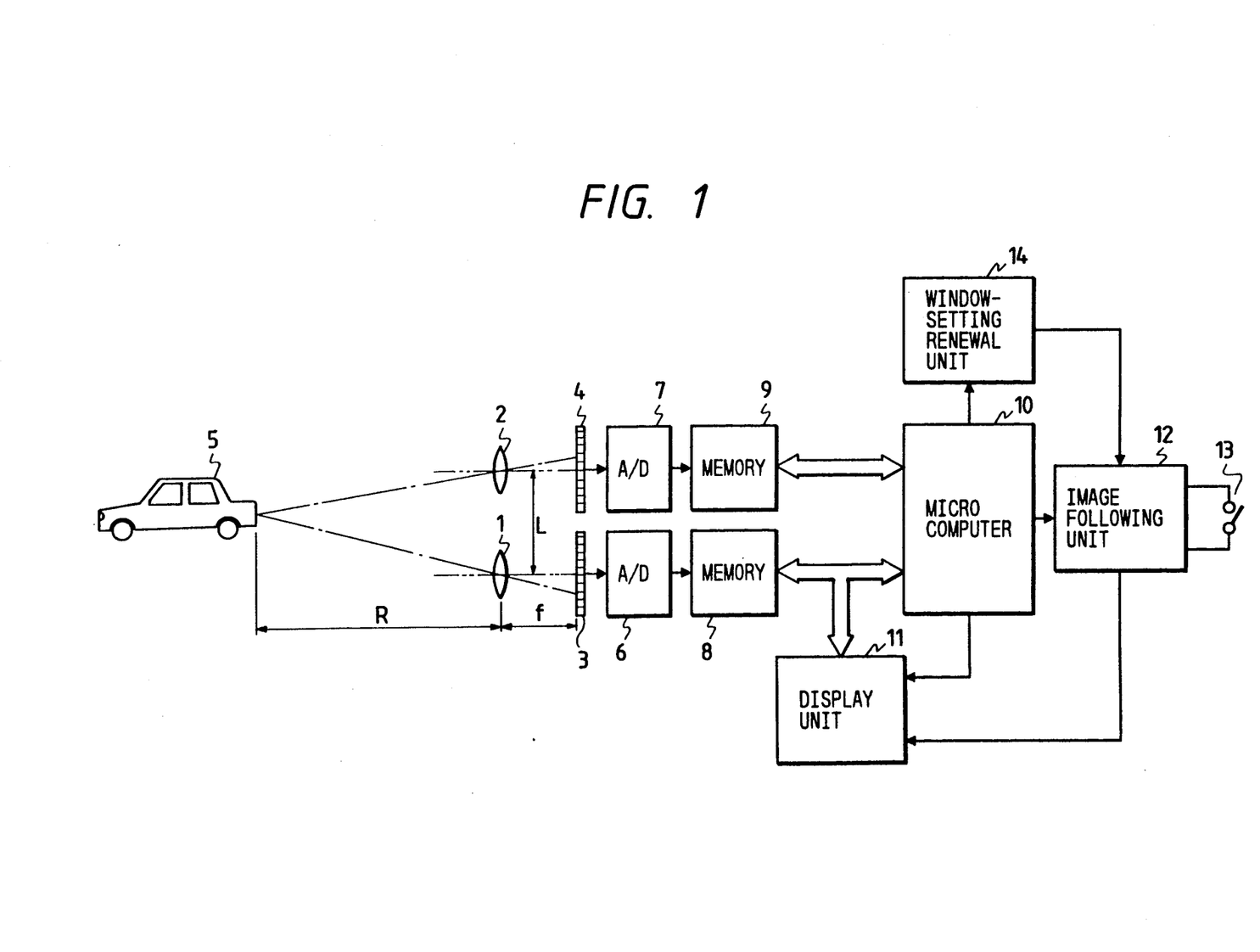
FIG. 1 is a construction of a distance measuring device according to an embodiment of the present invention.

In FIG. 1, a pair of lenses 1 and 2 constitute upper and lower optical systems, respectively; a pair of two-dimensional image sensors 3 and 4 are disposed at positions displaced from the lenses 1 and 2 by their focal distance (f), respectively; and a forerunning motor vehicle 5 is to be followed.

Analog-to-digital (A/D) converters 6 and 7 convert the analog image signals outputted from the image sensors 3 and 4 into digital signals, respectively; memories 8 and 9 are located following the A/D converters 6 and 7, respectively; and a microcomputer 10 detects a distance on the basis of the image signals outputted from the memories 8 and 9 and controls the image following operation.

A display screen 11 is provided for displaying an image picked up by the lower image sensor 3, the display screen 11 being controlled by the microcomputer 10. An image following unit 12 forms a first window 15 for following an image 5a of a forerunning vehicle on the screen 11, a second window 16 and a third window 17 set adjacent to the first window 15, so as to follow the forerunning vehicle image 5a. An image-follow instruction switch 13, coupled with the image following unit 12, is manually operated by a driver. A window-setting renewal unit 14 renews the positions of the first, second and third windows 15, 16, and 17 on the basis of the distance data calculated by the microcomputer 10 and image-following-condition data.

The operation of the aforementioned embodiment will be described with reference mainly to FIG. 1. An image of the forerunning vehicle 5, for example, is formed on the respective image sensors 3 and 4 through the paired lenses 1 and 2. The optical images thus formed on the image sensors are transformed into electrical analog image signals by the image sensors. The analog image signals are converted into digital image signals by the A/D converters 6 and 7, and are stored in the memories 8 and 9. The above sequence of the operations is repeated every sampling. By means of the control of the microcomputer 10, an image represented by the image signals stored in the memory 8 is displayed on the screen 11.

Figure 2:
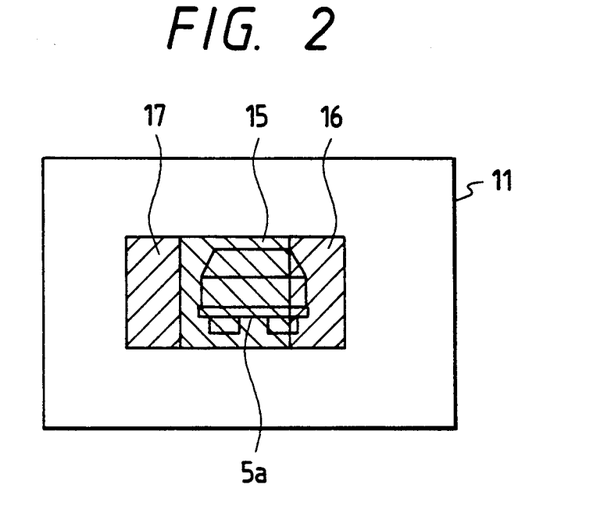
FIG. 2 is an explanatory diagram showing an image of a forerunning vehicle entering the screen of a display unit.

For example, if an image 5a of a forerunning vehicle 5 to be followed enters the image to be picked up by the lower image sensor 3, and is displayed on the screen 11 in which the first, second and third windows 15, 16, and 17 have been set, as shown in FIG. 2, in an off state of the image-follow instruction switch 13, a driver drives his vehicle relative to the forerunning vehicle 5 to a place where the forerunning vehicle image 5a is positioned within the first window 15.

Figure 3:
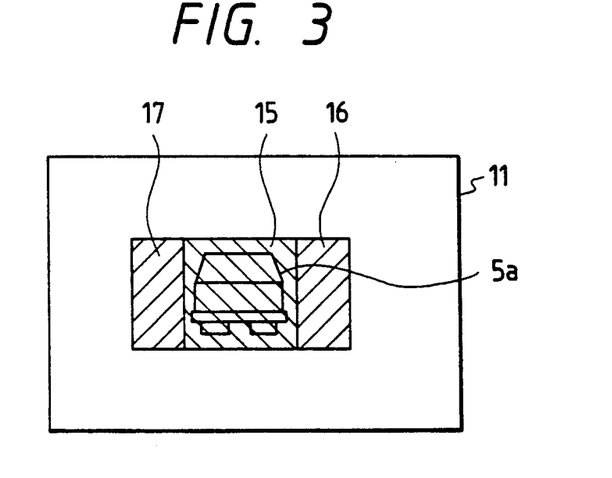
FIG. 3 is an explanatory diagram showing the forerunning vehicle image having entered the first window.

When the forerunning vehicle image 5a enters the area of the first window 15 as shown in FIG. 3, and the image-follow instruction switch 13 is operated by the driver, the window 15 transfers together with the image 5a whatever the forerunning vehicle image 5a moves within the first window 15, so that the first window automatically follows the forerunning vehicle image 5a. Together with the movement of the first window 15 for following the image, the second and third windows 16 and 17 located on both sides of the first window also are transferred. The image following operation is similar to that disclosed in Japanese Patent Publication Laid-Open No. Sho. 60-33352 or Japanese Patent Publication Laid-Open No. Hei. 1-35305, and hence no further description of it will be given here.

Next, the operation for distance measurement of the distance measuring device of the present embodiment will be described. First, the microcomputer 10 reads the image signals within the first window 15 which is now following the forerunning vehicle image 5a, from the memory 8 storing the image data output from the lower image sensor 3. The image signals thus read out are treated as reference image signals for the calculation of a distance.

Then, the microcomputer 10 specifies and selects a memory area corresponding to the first window 15 from the memory area of the memory 9 storing the image signals from the upper image sensor 4. Afterwards, the microcomputer vertically shifts the image signals read out from the memory 9 with respect to the reference image signals pixel by pixel, and accumulates the deviations each between the upper and lower corresponding pixel signals in each shifting, thereby obtaining the total sums of the absolute values of these deviations. Namely, a position of the image most resembling the image within the window 15 is obtained by shifting the image signals pixel by pixel. As seen from the illustration of FIG. 4 containing an image M8 in the memory 8 and an image M9 in the memory 9, the area in the memory 9 concerned with the distance calculation is an area 18 corresponding to the location of the first window 15. The area 18 contains an area which is similar to that of the first window 15 and results from the expansion of that toward the height direction.

Figure 4:
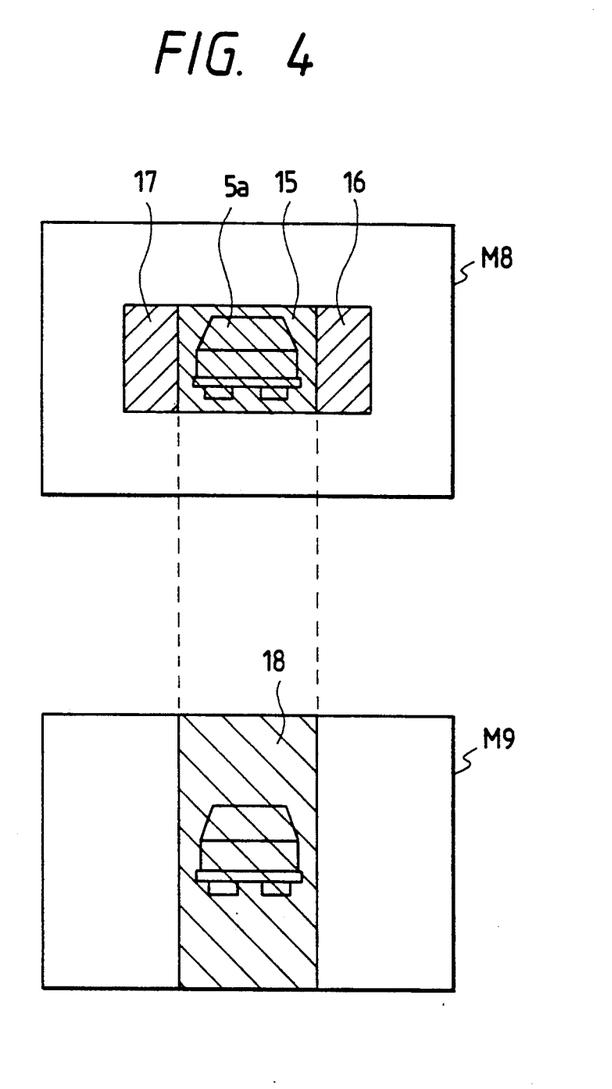
FIG. 4 shows explanatory diagrams showing the image within the first window and the memory area of an image memory to be compared therewith.

Assuming that the number of pixels shifted when the signals of the upper and lower corresponding pixels are compared and a minimum total sum of the absolute values of the deviation signals is reached, is (n) number of pixels, the pixel pitch is Po, the base line for the optical systems is L, and the focal length of each of the lenses 1 and 2 is (f), a distance R from the measuring vehicle to the forerunning vehicle 5 is expressed by the following equation.

Formula 2

$$R = (f \times L)/(n \times Po)$$

In this way, once a window is set for the forerunning vehicle 5, the window automatically follows the forerunning vehicle and measures the distance to the forerunning vehicle, even if the forerunning vehicle moves horizontally.

Figure 5:
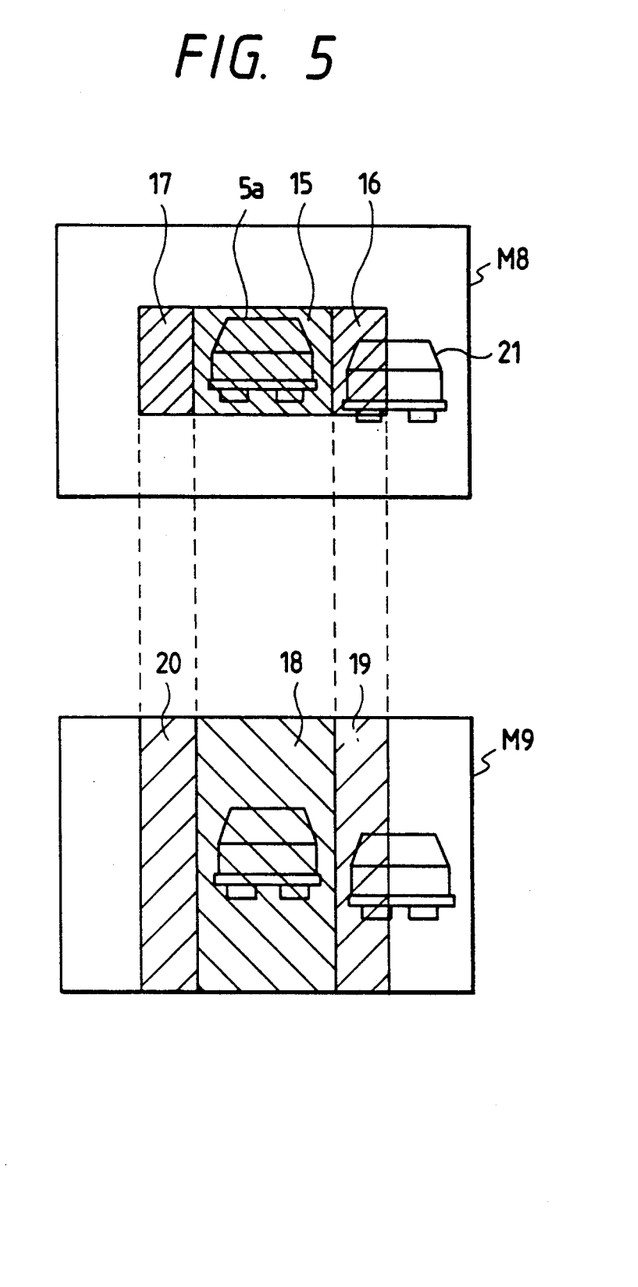
FIG. 5 shows explanatory diagrams showing images within the second and third windows, and the memory areas to be compared respectively with the images in the second and third windows.

Hereupon, a distance to another object entering the second window 16 set adjacent to the first window 15 which is now following the forerunning vehicle image 5a, from the measuring vehicle can also be measured in a similar manner. When, as shown in FIG. 5, another forerunning vehicle running on the adjacent lane enters the fields of sight of the image sensors 3 and 4, and the second window 16 catches an image 21 of this forerunning vehicle, the microcomputer 10 reads the image signals within the second window 16 from the memory 8 storing the image signals of the lower image sensor 3. Subsequently, the image signals are treated as reference image signals for distance calculation.

Then, the microcomputer 10 specifies and selects a memory area corresponding to the second window 16 from the memory area of the memory 9 storing the image signals from the upper image sensor 4. Afterwards, the microcomputer vertically shifts the image signals within the area 19 with respect to the reference image signals pixel by pixel, and accumulates the deviations each between the upper and lower corresponding pixel signals in each shifting, thereby obtaining the total sums of the absolute values of these deviations, and consequently a position of the image most resembling the image within the second window 16.

Assuming that the number of pixels shifted when the signals of the upper and lower corresponding pixels are compared and a minimum total sum of the absolute values of the deviation signals is reached, is (m) number of pixels, a distance A from the measuring vehicle to the forerunning vehicle 5 is expressed by the following equation.

Formula 3

$$A = (f \times L)(m \times Po)$$

A distance from the measuring vehicle to an additional object caught by the third window 17 may also be measured in a similar manner. Hence, as shown in FIG. 5, the microcomputer 10 reads the reference image signals of the image signals within the third window 17 and selects the area 20 corresponding to that of the window 17 from the memories 8 and 9 storing the image signal data of the upper and lower image sensors 3 and 4. Then, the microcomputer 10 compares the image signals within the area 20 with the reference image signals, thereby calculating the distance from the measuring vehicle to the object within the third window 17. The distance thus obtained is denoted as B.

Distance data of the distance R, and the distances A and B from the measuring vehicle to the respective objects caught by the second and third windows 16 and 17, which are located near the first window 15 currently following the forerunning vehicle image 5a, are momentarily input to the window-setting renewal unit 14.

Not only the distance data of the objects caught by the first to third windows 15, 16, and 17 but also image-following-condition data generated when the first window 15 follows the forerunning vehicle image 5a are input into the window-setting renewal unit 14 under control of the microcomputer 10. Means for detecting the additional data input to the window-setting renewal unit 14, viz., means for detecting a condition of following the forerunning vehicle image 5a by the first window 15, will be described.

In the present embodiment, means for detecting a symmetry of an image within the first window 15 is used for the image-following-condition detecting means for detecting a condition of the image following by the first window 15. The reason for this is that a figure of the forerunning vehicle image 5a followed by the first window 15 is the back of the vehicle, and is symmetrical in most of the vehicles. If the image following operation of the forerunning vehicle image 5a by the first window 15 goes well, the image within the first window 15 will have a high degree of symmetry. If it goes poorly, the image will have a low degree of symmetry.

Thus, the following condition of the forerunning vehicle image 5a by the first window 15 can be detected by determining a symmetry of the image within the first window 15.

Figure 6:
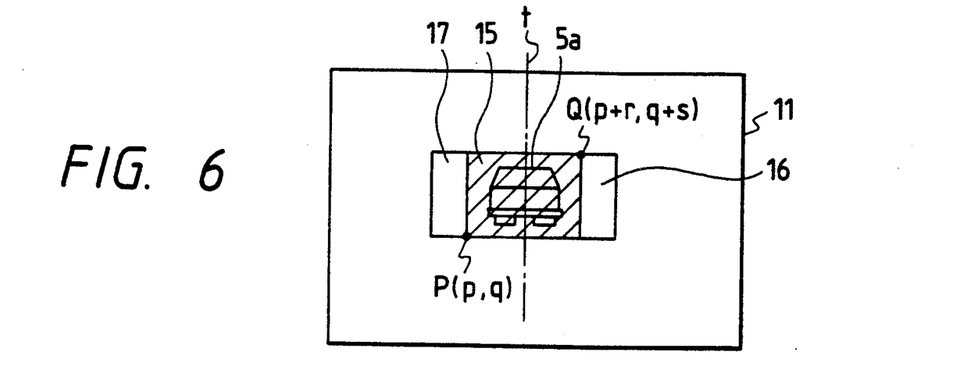
FIG. 6 is an explanatory diagram showing the screen in which the first window is expressed in terms of coordinates, the illustration being useful in explaining how a symmetry of the image in the first window is detected.

Means for determining a symmetry of the image within the first window 15 will be described. The lower left corner and the upper right corner of the first window 15 currently following the forerunning vehicle image 5a, respectively, are denoted as P and Q, as shown in FIG. 6. Points P and Q may be expressed as (p, q) and (p+r, q+s) in terms of the coordinates of pixels in an image displayed on the screen 11. A symmetry of the image is determined by horizontally scrolling the display within the range from the coordinates (p, q) to the coordinates (p+r, q+s) of the first window 15. That is, to determine the symmetry of the image, the following equation is operated, with the image signal of each pixel on the screen being expressed by Sxy (where x and y: X- and Y-components of the pixel coordinates within the displayed image).

Formula 4

$$C = \sum_{j=q}^{g+s} \sum_{i=0}^{r/2} |S_{a-ij} - S_{a+ij}|$$

In the formula 4, (a) represents an integer given by the following equation, and the X-coordinate of the symmetry axis (t).

Formula 5

$$a = p + (r/2)$$

If a value of C obtained is equal to or smaller than a threshold value, it may be considered that the image within the first window 15 has a high degree of symmetry, and the image following operation is stable.

The data on the condition of the image following by the first window 15 that is detected in the above-mentioned manner, and the distance data R, A, and B of the first, second, and third windows 15, 16, and 17 are input to the window-setting renewal unit 14.

Figure 7:
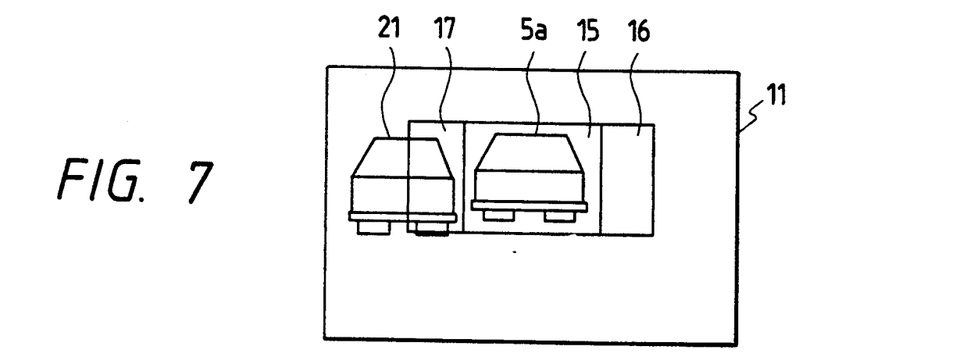
FIG. 7 is an explanatory diagram showing the screen in which another vehicle appears between a forerunning vehicle currently being followed and a measuring vehicle, and the third window catches an image of the new vehicle.

When, as shown in FIG. 7, another forerunning vehicle running on an adjacent lane to the lane of the forerunning vehicle 5 being currently followed by the first window 15, enters the field of sight of the image sensor 3, and an image 21 of the forerunning vehicle on the adjacent lane is caught by the third window 17, a distance B from the measuring vehicle to the forerunning vehicle of the vehicle image 21 is obtained by the microcomputer 10.

Figure 8:
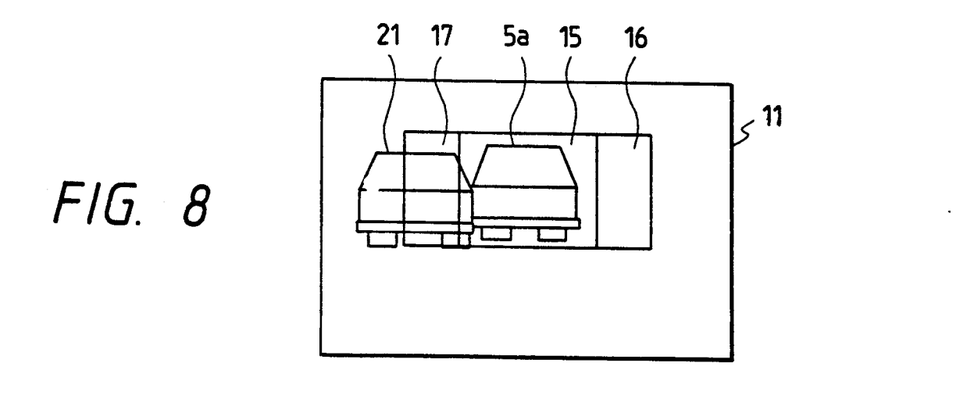
FIG. 8 is an explanatory diagram showing the screen in which the forerunning vehicle caught by the third window shown in FIG. 7 intrudes into the space between the forerunning vehicle currently being followed and the measuring vehicle.

When the forerunning vehicle caught by the third window 17 intrudes into a space between the forerunning vehicle 5 being followed by the first window 15 and the measuring vehicle, the two forerunning vehicle images 5a and 21 are displayed on the screen 11, as shown in FIG. 8.

As shown, the forerunning vehicle image 5a within the first window 15 and the forerunning vehicle image 21 provided in the third window 17 partially overlap, so that a part of the forerunning vehicle image 5a disappears from the screen 11. In this case, the distance B from the measuring vehicle to the forerunning vehicle of the image 21 caught by the third window 17 is shorter than the distance R from the measuring vehicle to the forerunning vehicle 5 followed by the first window 15.

As shown in FIG. 8, the forerunning vehicle image included by the first window 15 contains the forerunning vehicle image 5a of which a part disappears from the screen owing to the overlapping with the forerunning vehicle image caught by the third window 17, that is the intruding vehicle image 21. Therefore, the forerunning vehicle image included by the first window 15 has a low degree of symmetry.

Figure 9:
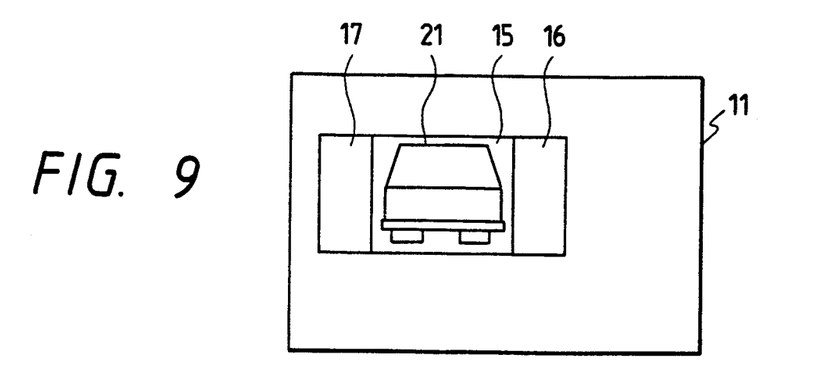
FIG. 9 is an explanatory diagram showing the screen in which all of the windows are transferred by the window-setting renewal means and the intruding vehicle shown in FIG. 8 is caught, as an object to be followed, by the first window.

At this time, the image-following-condition detecting means detects that a condition of following the forerunning vehicle image 5a by the first window 15 is poor, as shown in FIGS. 8 and 9. At the time, the first to third windows 15 to 17 are largely transferred toward the intruding forerunning vehicle image 21 (that is the third window 17 direction), so that the forerunning vehicle image 21 of which a main part has been lain within the third window 17 is to be provided in a center of the first window 15. The distance measuring device considers the forerunning vehicle image 21 included in the first window 15 as a new forerunning vehicle running on the same lane as that of the measuring vehicle, and continues to follow an image of the new forerunning vehicle.

Now, the forerunning vehicle image 5a which has been followed by the first window 15 has completely disappeared from the screen 11, as shown in FIG. 9, and the screen 11 contains the first window 15 containing the intruding forerunning vehicle image 21 as the new forerunning vehicle, and the second and third windows 16 and 17 which are set adjacent to the first window 15.

Those windows 15, 16, and 17 are all transferred by the window-setting renewal unit 14. The function of the window-setting renewal means 14 is as follows. When either of the distances A and B from the measuring vehicle to the object caught by the second or third window 16 or 17 is shorter than the distance R from the measuring vehicle to the forerunning vehicle image 5a provided in the first window 15, and further the image-following-condition detecting means detects that a condition of following the forerunning vehicle image 5a by the first window 15 is "bad" (determines that the value of C obtained by the equation (4) is a threshold value or more), the window-setting renewal means determines that another car has intruded into a space between the measuring vehicle and the present forerunning vehicle. As a result, the window-setting renewal means transfers all the windows 15 to 17 toward either direction of the second window 16 or the third window 17 which may have caught the intruding forerunning vehicle. In this way, the window-setting renewal means renews the settings of the respective windows 15, 16 and 17 so as to allow the first window 15 to follow an image of the intruding forerunning vehicle.

Figure 10:
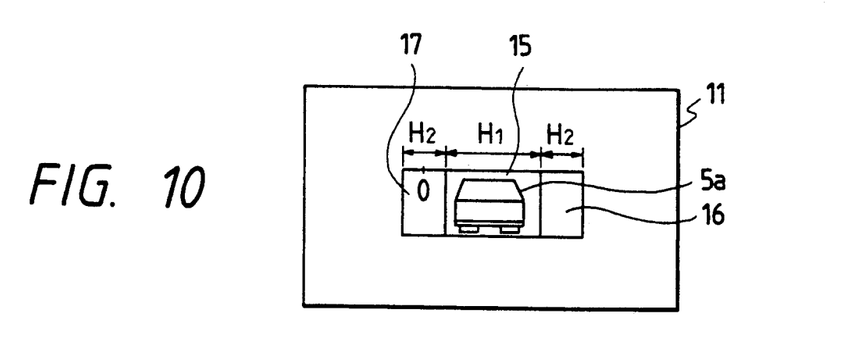
FIG. 10 is an explanatory diagram showing the screen in which the first to third windows are not yet transferred by the window-setting renewal means.
Figure 11:
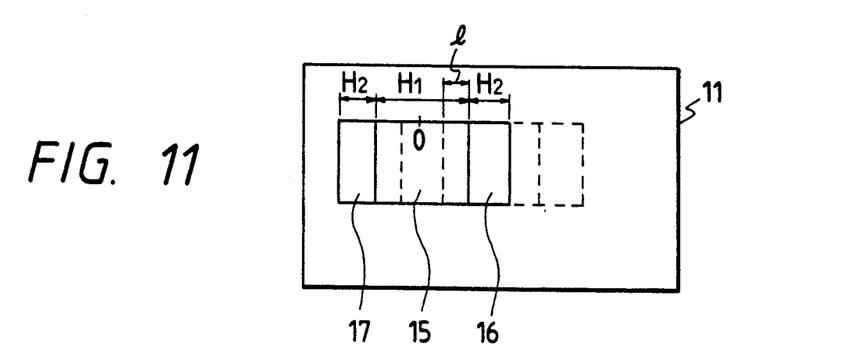
FIG. 11 is an explanatory diagram showing the screen in which the first to third windows have been transferred by the window-setting renewal means.

The manner in which the windows 15, 16 and 17 are transferred by the window-setting renewal means will be described below. For example, it is assumed that the first to third windows 15 to 17 are positioned as shown in FIG. 10, and the first window 15 is following the forerunning vehicle image 5a. The three windows are horizontally transferred by means of the window-setting renewal means. FIG. 11 illustrates how the windows 15 to 17 are transferred when the intruding forerunning vehicle image enters the first window 15 as shown in FIG. 7 through FIG. 9.

In FIG. 11, the positions of all the windows 15, 16 and 17 (corresponding to the positions of them as indicated by a solid line in FIG. 10) before transferring are indicated by a broken line, and the positions of them after transferring are indicated by a solid line. In the figure, the width of the first window 15 is H1, and the width of each of the second and third windows is H2. (Here, H1>H2.) A transferring amount Z of each of the windows 16 and 17 when those are transferred by the window-setting renewal unit 14 operated is given by the following formula.

Formula 6

$$Z = H_2 + (H_1 - H_2)/2 = H_2 + 1$$

Hence, the first window 15 is transferred such that the center of the horizontal component H of the first window 15 is positioned at the center O of the horizontal component $H_2$ of the third window 17. At this time, the second and third windows 16 and 17 set adjacent to the first window 15 are also transferred together thereof. By the above-mentioned function of the window-setting renewal means, the first window 15 detects an appearance of the intruding forerunning vehicle, for example, and follows an image of the correct forerunning vehicle at all times.

While the embodiment of the present invention that is at present believed to be preferred has been described in detail, it is evident to those skilled in the art that those means described above, particularly the way of setting the second and third windows, the image-following-condition detecting means for the first window, and the window-setting renewal means are not limited to those as described above, but may be variously modified depending on the characteristics of the image following unit and image signal data, and the like. Hence, it should be understood that these means in the embodiment are specific examples and may be variously changed, modified and altered without departing from the true spirit and scope of the present invention.

In the above-mentioned embodiment, the optical systems and the image sensors are vertically arranged, but those may be horizontally or obliquely arranged. A substantially vertical arrangement of the optical systems including the exactly vertical arrangement of the optical systems suffices. One image sensor suffices to operate the present invention, although two image sensors are used in the embodiment mentioned above. Further, the required number of subwindows is at least one.

As described above, a vehicle-to-vehicle distance measuring device of the present invention comprises: image sensors for picking up a forerunning vehicle through a pair of optical systems substantially vertically arranged; display means for displaying an image of the forerunning vehicle picked up by the image sensor; image following means for setting a following window including the forerunning vehicle in a part on the display means and subwindows adjacent to the following window, and for following an image of the forerunning vehicle by the following window; first and second distance detecting means for calculating distances from a measuring vehicle to objects of which the images are provided in the following window and the subwindow; image-following-condition detecting means for detecting a condition of following an image of the forerunning vehicle by the following window; and window-setting renewal means for renewing the settings of the following window and the subwindows on the basis of image-following-condition data detected by the image-following-condition detecting means and distance data detected by the first and second distance detecting means, thereby to exchange the old forerunning vehicle followed by the following window for a new one.

With such an arrangement, even when a plurality of vehicles run ahead of the measuring vehicle, a forerunning vehicle as a target is displayed in the following window. While watching an image of the forerunning target vehicle in the window, a driver may readily know the target vehicle which is being followed by his vehicle for the purpose of vehicle-to-vehicle distance measurement.

Further, during the image following operation, the driver can correctly recognize a condition (good or bad) of following the target vehicle by the following window. With provision of the window-setting renewal means, an intruding forerunning vehicle, when it appears, can be detected. When the intruding vehicle causes the old forerunning vehicle to disappear from the screen, the intruding vehicle is treated as a new forerunning target vehicle, so that the following window may continue the image following operation. Thus, the correct forerunning vehicle is followed at all times, ensuring a correct measurement of the vehicle-to-vehicle distance. Even in a situation where an intruding vehicle appears, the measuring vehicle will collide with the intruding vehicle by less possibility, and the measuring vehicle will run under the reliable vehicle-to-vehicle distance control.

What is claimed is:

1. A distance detecting device for measuring a distance from a follow object by trigonometrical measurement, by use of a pair of image signals representing a pair of object images of said follow object on image sensors through respective optical systems having parallel optical axes, said distance detecting device comprising:

display means for displaying said object image based on an object image signal picked up by one of said image sensors;

following means for setting a following window in a part including said object image on said display means so as to continuously follow said object image by said following window, at least one subwindow being adjacent to said following window and including another object image on said display means;

first distance detecting means for detecting a deviation between an image signal of said follow object from another one of said image sensors and said object image signal provided in said following window thus set as a reference, so as to calculate a distance to said follow object from said optical systems by said trigonometrical measurement;

second distance detecting means for detecting a deviation between an image signal of another object from said another image sensor and an another object image signal provided in each subwindow thus set as a reference, so as to calculate each distance to said another object included in said each subwindow from said optical systems by said trigonometrical measurement;

image-following-condition detecting means for detecting a condition following said object image in said following window, on the basis of the image signal data within said following window; and window-setting renewal means for calculating a change of the movement of said follow object on the basis of the image-following-condition detecting means and the distance data from said first and second distance detecting means, to determine whether or not to renew the position of said following window and subwindow to follow said another object on said display means according to the calculated change.

2. A distance detecting device according to claim 1, wherein said optical systems are positioned in vertical direction.

3. A distance detecting device according to claim 1, wherein said optical systems are positioned in horizontal direction.

4. A distance detecting device according to claim 1, wherein said image-following-condition detecting means detects a symmetry of said object image within said following window, when said object is provided with a symmetric form.

5. A distance detecting method for measuring a distance from a follow object by trigonometrical measurement, by use of a pair of object image signals representing a pair of object images of said follow object on image sensors through respective optical systems having parallel optical axes, said distance detecting method comprising the steps of:

setting a following window on a display means in a part including said object image picked up by one of said image sensors so as to continuously follow said object image by said following window;

setting at least one subwindow adjacent to said following window on said display means, in which said subwindow includes another object image picked up by said one image sensor picking up said object image;

detecting a deviation between an image signal of said object image picked up by another one of said sensors and an object image signal provided in said following window thus set as a reference so as to calculate a distance to said follow object from said optical systems by said trigonometrical measurement;

detecting a deviation between an image signal of another object image picked up by said another one of said sensors and another object image signal provided in each subwindow thus set as a reference so as to calculate each distance to another object from said optical systems by said trigonometrical measurement;

detecting a condition following said object image in aid following window, on the basis of the image signal data within said following window; and renewing the position of said following window and subwindow on said display means by a decision changing the follow object to said another object, on the basis of the detected image-following-condition data and the detected distance data of said follow object and said another object.

* * * * *